G. W. GOLDING.
DEVICE FOR LAYING OFF WOODEN AXLES.
APPLICATION FILED MAY 1, 1909.
945,515.
Patented Jan. 4, 1910.
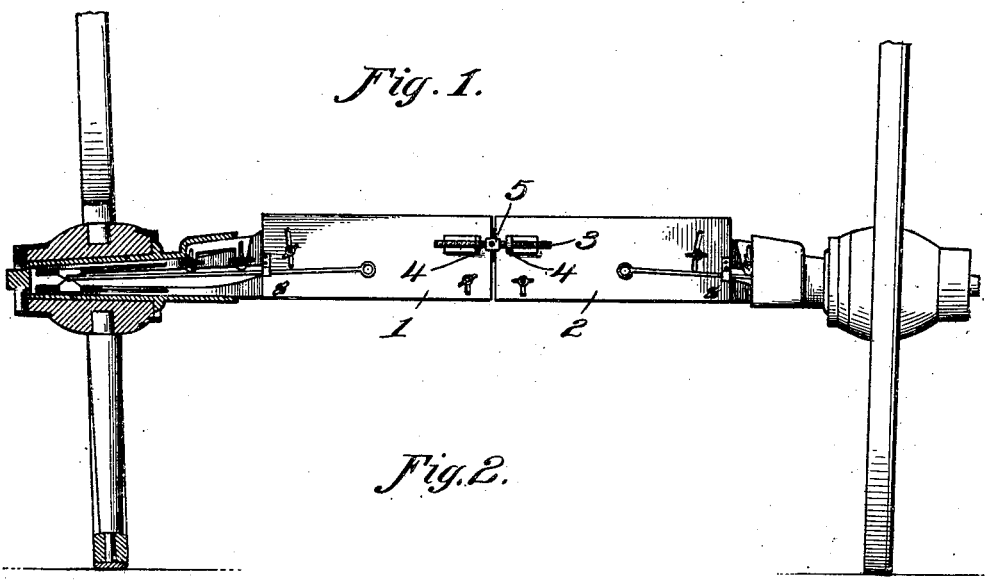
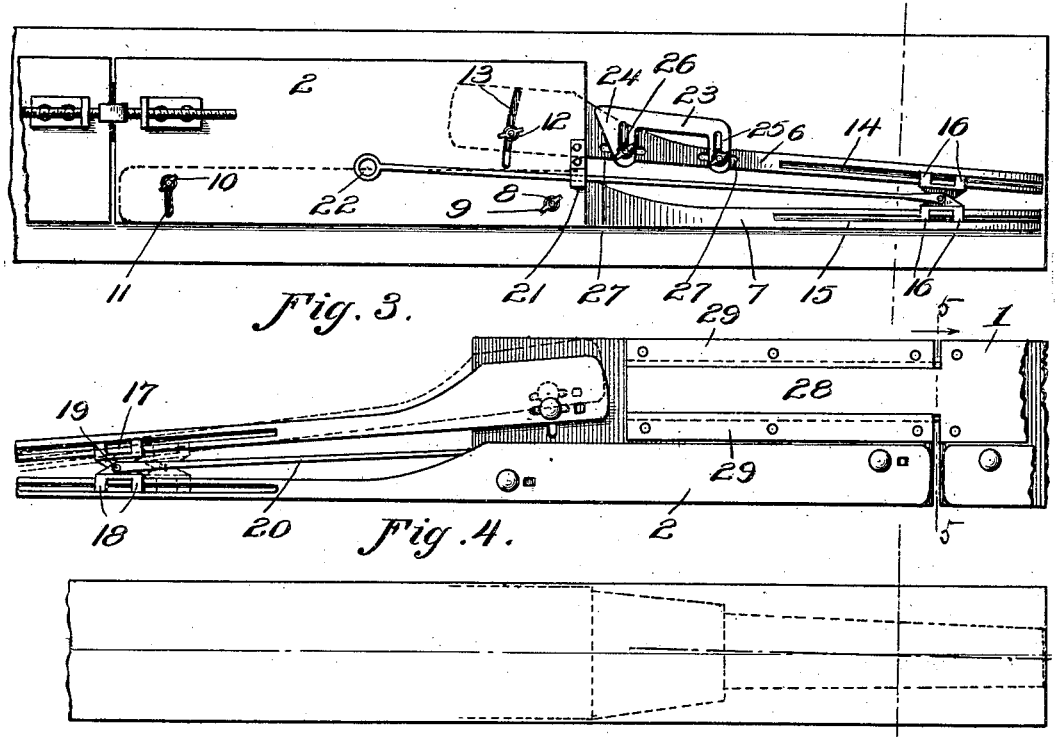
Witnesses
F. C. Gibson.
R. M. Smith.
Inventor
George W. Golding
By Victor J. Evans
Attorney

UNITED STATES PATENT OFFICE.

GEORGE W. GOLDING, OF LODI, NEW YORK.

DEVICE FOR LAYING OFF WOODEN AXLES.

945,515.  Specification of Letters Patent.  Patented Jan. 4, 1910.

Application filed May 1, 1909. Serial No. 493,387.

*To all whom it may concern:*

Be it known that I, GEORGE W. GOLDING, a citizen of the United States, residing at Lodi, in the county of Seneca and State of New York, have invented new and useful Improvements in Devices for Laying Off Wooden Axles, of which the following is a specification.

This invention relates to devices for laying off wooden axles, the object in view being to provide an axle templet embodying a number of relatively movable and adjustable sections together with means for adjusting the several sections whereby the outline or general form of the templet may be varied in accordance with requirements such as the size, taper or shape of the axle skeins, the adjustments being easily effected and maintained by the means hereinafter described.

The invention consists in the novel construction, combination and arrangement of parts as herein fully described, illustrated and claimed.

In the accompanying drawings:—Figure 1 is a front elevation of the templet complete, showing the relation of the same to a pair of axle skeins and illustrating the manner of adjusting the templet arms to give the desired lateral pitch to the wheels. Fig. 2 is an enlarged elevation of one end of the complete templet. Fig. 3 is an elevation looking toward the reverse side thereof. Fig. 4 is a plan view thereof. Fig. 5 is a detail cross section on the line 5—5 of Fig. 3.

The templet comprises essentially two main body sections 1 and 2 which approach each other on a common central vertical line as shown in Fig. 2 and are connected for relative adjustment by means of a gage regulating screw 3 having right and left hand threads engaging nuts or threaded extensions 4 on the sections 1 and 2 and being provided with a central head 5 by means of which the screw may be turned for the purpose of causing a movement of the sections 1 and 2 toward or away from each other to adapt the templet as a whole to axles of different lengths.

Connected to each of the main body sections 1 and 2 is a pair of templet arms 6 designating the upper templet arm and 7 the lower templet arm. These arms project beyond the end of the main body section to which they are connected, the lower section 7 being pivotally mounted on a bolt 8 carried by the section 2, said bolt 8 being provided with a clamp nut 9. At its inner end the lower templet arm 7 is provided with a similar clamp 10 the shank of which is movable in a slot 11 in the section 2 so that by adjusting the clamp 10 in the slot 11 the arm 7 may be swung on the pivot 8 and any desired angularity imparted to said arm. The upper templet arm 6 is provided with a clamp 12 which is movable up and down in a curved slot 13 in the section to which it is attached so as to provide for adjusting the angle of said upper templet arm. Both arms are provided in opposite sides with longitudinal grooves 14 and 15 into which extend lips or tongues 16 on a runner which consists of two sections 17 and 18 having overlapping ears or portions which are connected by a pivot 19. Connected to the pivot 19 is one end of a runner adjusting rod 20 which passes through an eye or guide 21 on the section 2 and is provided at its inner end with a suitable handle 22 whereby said rod may be moved endwise to cause the jointed runner to move lengthwise of the templet arms 6 and 7 for the purpose of spreading the same apart or drawing the same together as will be readily understood from Figs. 2 and 3.

Each of the upper templet arms 6 has mounted thereon a shoulder templet 23 which is provided at opposite ends with slotted arms 24 and 25 carrying clamping bolts 26 which are also adjustable in slots 27 extending lengthwise of the upper templet arm, the arrangement described providing for the laying off of the axle shoulder adjacent to the skein and the proper spacing of said shoulder to provide the necessary bearing within the skein.

One of the main body sections is provided with a tongue piece 28 projecting beyond the inner end thereof and working in a guideway on the adjoining section as best illustrated in Figs. 2 and 5, said guideway being shown as formed by a pair of parallel strips or cleats 29 having under-cut edges as shown in Fig. 5, a corresponding dove-tailed shape being imparted to the tongue piece 28 as shown in the same figure, thereby preventing lateral displacement of the tongue piece from the guideway in which it is adapted to slide when the two body sections are adjusted relatively to each other by means of the gage regulating screw 3.

I claim:—

1. A vehicle axle templet comprising a main templet body, templet arms arranged in pairs projecting from opposite ends thereof and having a jointed connection with the body, a runner having a sliding engagement with each pair of templet arms, and means for shifting the runner lengthwise of said arms.

2. A vehicle axle templet comprising a main templet body, templet arms arranged in pairs projecting from opposite ends thereof and having a jointed and adjustable connection with the body, a runner having a sliding engagement with each pair of templet arms, and means for shifting the runner lengthwise of said arms.

3. A vehicle axle templet comprising a main templet body, templet arms arranged in pairs projecting from the opposite ends thereof and having a jointed connection with the body, a runner having a tongue-and-groove engagement with each pair of templet arms, and means for shifting the runner lengthwise of said arms.

4. A vehicle axle templet comprising a main templet body embodying relatively adjustable sections, templet arms arranged in pairs projecting from opposite ends thereof and having a jointed connection with the body, a runner having a sliding engagement with each pair of templet arms, and means for shifting the runner lengthwise of said arms.

5. A vehicle axle templet comprising a main templet body, templet arms arranged in pairs projecting from the opposite ends thereof and having a jointed connection with the body, a runner having a sliding engagement with each pair of templet arms, means for shifting the runners lengthwise of said arms, and shoulder templets adjustable on the upper templet arms.

6. A vehicle axle templet comprising a main templet body embodying relatively adjustable sections, a gage regulating screw for adjusting said sections relatively to each other, templet arms projecting from opposite ends thereof and having a jointed connection with the body, a runner having a sliding engagement with each pair of templet arms, and means for shifting the runner lengthwise of said arms.

7. A vehicle axle templet comprising a main templet body, templet arms arranged in pairs projecting from opposite ends thereof and having a jointed connection with the body, a runner embodying pivotally connected sections having a sliding engagement with each pair of templet arms, and means for shifting the runner lengthwise of said arms.

In testimony whereof I affix my signature in presence of two witnesses.

GEORGE W. GOLDING.

Witnesses:
GEORGE W. GALE,
PAUL COTTRELL.